United States Patent [19]

Kurokawa et al.

[11] 4,112,260
[45] Sep. 5, 1978

[54] AC TYPE LINE CONCENTRATOR

[75] Inventors: Takashi Kurokawa; Michio Fujiwara, both of Kodaira; Yoshio Akutsu, Koganei; Akoi Otani, Owariasahi; Harumi Nagasawa, Hadano; Masujiro Matsuo, Yokohama; Yasuo Ishii, Tokyo; Sigeru Ogawa, Musahino; Schun'ichi Itoh, Musashino; Daisuke Takei, Musashino, all of Japan

[73] Assignees: Hitachi Denshi Kabushiki Kaisha; Japanese National Railways; Hitachi, Ltd., all of Japan

[21] Appl. No.: 764,570

[22] Filed: Feb. 1, 1977

Related U.S. Application Data

[63] Continuation-in-part of Ser. No. 666,439, Mar. 12, 1976, abandoned.

[30] Foreign Application Priority Data

Mar. 26, 1975 [JP] Japan ................................. 50-35614

[51] Int. Cl.² ............................................. H04M 3/00
[52] U.S. Cl. .......................... 179/18 FC; 179/18 GF
[58] Field of Search .............. 179/18 FC, 18 F, 18 G, 179/18 GF, 15 FD, 2.5 R

[56] References Cited

U.S. PATENT DOCUMENTS

3,073,906  1/1963  Lee ................................... 179/18 FC
3,988,543  10/1976  Dall'Olio et al. ............... 179/15 FD Primary Examiner—Thomas A. Robinson
Attorney, Agent, or Firm—Craig & Antonelli

[57] ABSTRACT

An ac type line concentrator for use in a data communication system, comprising a crosspoint switch circuit. The crosspoint switch circuit is constituted by a plurality of crosspoint switches capable of switching an analog signal (hereinafter referred to as an analog switch), so that a carrier signal modulated by a data signal may be transferred from one of m incoming lines connected with m terminal units to a selected one of n(n<m) outgoing lines connected with a central unit through the ac type line concentrator without being demodulated.

6 Claims, 13 Drawing Figures

AC TYPE LINE CONCENTRATOR

CROSS REFERENCE TO RELATED APPLICATION

This is a continuation in Part of U.S. Ser. No. 666,439 filed on Mar. 12, 1976, now abandoned.

BACKGROUND OF THE INVENTION

1. Field of the Invention

This invention relates to a line concentrator used in a data communication system or the like, and more particularly to an ac type line concentrator provided with a crosspoint switch circuit capable of switching an analog signal in which a received carrier signal is transferred through the crosspoint circuit from one of a plurality of incoming lines to a selected one of a plurality of outgoing lines without being demodulated.

In a data communication system which is provided with a line concentrator, a central unit and a plurality of terminal units, m lines on the terminal unit side (hereinafter referred to as incoming lines) are concentrated into $n$ ($n < m$) lines on the central unit side (hereinafter referred to as outgoing lines), thereby to increase the communication efficiency of the transmission lines and thus attain the economical use thereof.

2. Description of the Prior Art

Figure 1:
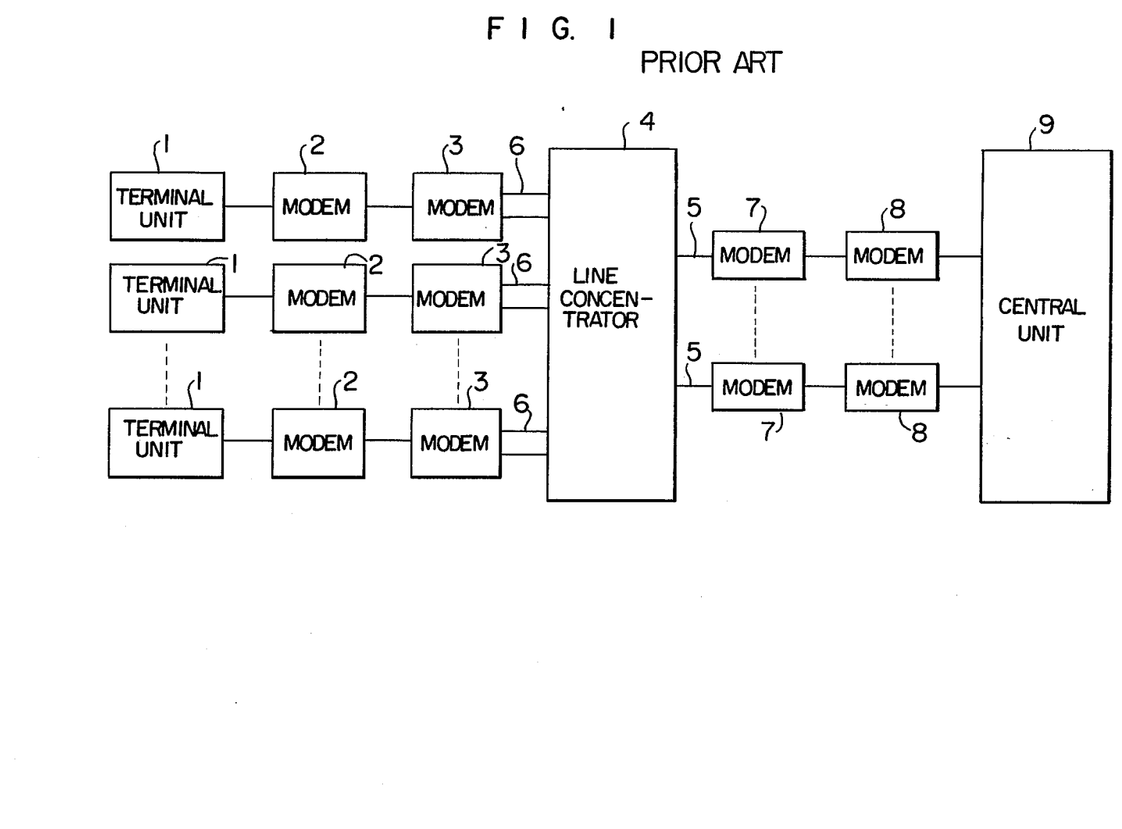
FIG. 1 is a block diagram showing the arrangement of a data communication system using a prior art line concentrator.

Various line concentrators have been proposed hitherto. FIG. 1 shows, by way of example, a conventional line concentrator for use in a data communication system.

Referring to FIG. 1, the data communication system is provided with a plurality of terminal units 1, a plurality of modulating and demodulating means 2, 3, 7 and 8 (hereinafter referred to as a modem), a line concentrator 4, n outgoing lines 5, $m$ ($m > n$) incoming lines 6, and a central unit 9. In the data communication system having such an arrangement, a data signal supplied from one of the terminal units 1 is modulated by the associated modem 2, and the output of the modem 2 is transferred to the associated modem 3 in the form of a carrier frequency signal. The modem 3 demodulates the received carrier frequency signal to transmit the data signal to the line concentrator 4, and simultaneously supplies to the line concentrator 4 a carrier detection signal (hereinafter referred to as a CD signal). Upon reception of the CD signal indicating the reception, the line concentrator 4 connects a specific incoming line 6 associated with the detected CD signal to an idle and available one of the outgoing lines 5. The data signal supplied to the selected one of the outgoing lines 5 through the specific incoming line 6 connected thereto is modulated by the associated modem 7 again, and the output of the modem 7 is transferred to the associated modem 8 which demodulates the modulated signal again to transmit the data signal to the central unit 9. When the central unit 9 receives the data signal transmitted from a specific terminal unit 1, the central unit 9 can also transmit a data signal to the specific terminal unit 1.

However, in such data communication system, the modem 3 and the modem 7 respectively associated with each incoming line 6 and each outgoing line 5 have been inevitably required since the method of data communication comprises the steps of demodulating a carrier frequency signal into dc signal form before applying the same to the line concentrator 4, establishing the connection between the incoming and outgoing lines 6 and 5 through the crosspoint switches in the line concentrator 4, and then modulating the dc signal again by the modems 7 and 3 for the transmission of data between the central unit 9 and the specific terminal unit 1. Thus, the data communication system shown in FIG. 1 has been defective in that it is complex in structure and therefore uneconomical. Further, this data communication system has been quite expensive due to the fact that the number of these modems 3 and 7 is necessarily increased with the increase in the number of the incoming and outgoing lines, and the floor area required for the installation of these modems is correspondingly increased.

SUMMARY OF THE INVENTION

With a view to obviate such prior art defects, it is a primary object of the present invention to provide an ac type line concentrator in which means including a crosspoint circuit composed of analog switches are provided so that a carrier frequency signal can be applied to the crosspoint circuit in ac signal form without being demodulated, and can be transmitted in this signal form over incoming and outgoing lines connected by line concentrator, thereby eliminating the necessity for provision of the modems 3 and 7 which have been essentially required for the individual incoming and outgoing lines connected by the prior art line concentrator. Another object of the present invention is to provide an ac type line concentrator which is capable of line concentration without being affected by the speed of data communication in a data communication system utilizing voice frequency transmission lines, so that the economical use of the data communication system can be fully attained.

In accordance with one aspect of the present invention, there is provided an ac type line concentrator for use for line concentration in a data communication system or the like including a central unit and a plurality of terminal units, comprising a crosspoint circuit composed of analog switches for disconnectably connecting m incoming lines and $n$ ($n < m$) outgoing lines, a control circuit for applying a connection control instruction signal to said crosspoint circuit in response to the detection of a carrier frequency signal appearing on said incoming and outgoing lines, impedance matching means for maintaining constant the impedances of said lines irrespective of on-off operation of said analog switches in said crosspoint circuit, and means for applying the carrier frequency signal appearing on said incoming and outgoing lines to said crosspoint circuit in ac signal form without demodulating the same, whereby the carrier frequency signal can be transmitted over said incoming and outgoing lines in the ac signal form.

In accordance with another aspect of the present invention, there is provided a line concentrator of the above character, further comprising means for applying a terminal make-busy carrier signal to any one, of said terminal units thereby making busy said terminal unit.

In accordance with still another aspect of the present invention, there is provided a line concentrator of the above character, further comprising carrier detecting the means for detecting appearance of a carrier frequency signal on all of said outgoing lines connected to said central unit prior to appearance of the carrier frequency signal on said incoming lines thereby applying a detection output to said control circuit, and terminal make-busy switches operating in response to the application of the resultant output of said control circuit thereby making busy all said terminal units.

DESCRIPTION OF THE PREFERRED EMBODIMENT

Figure 2:
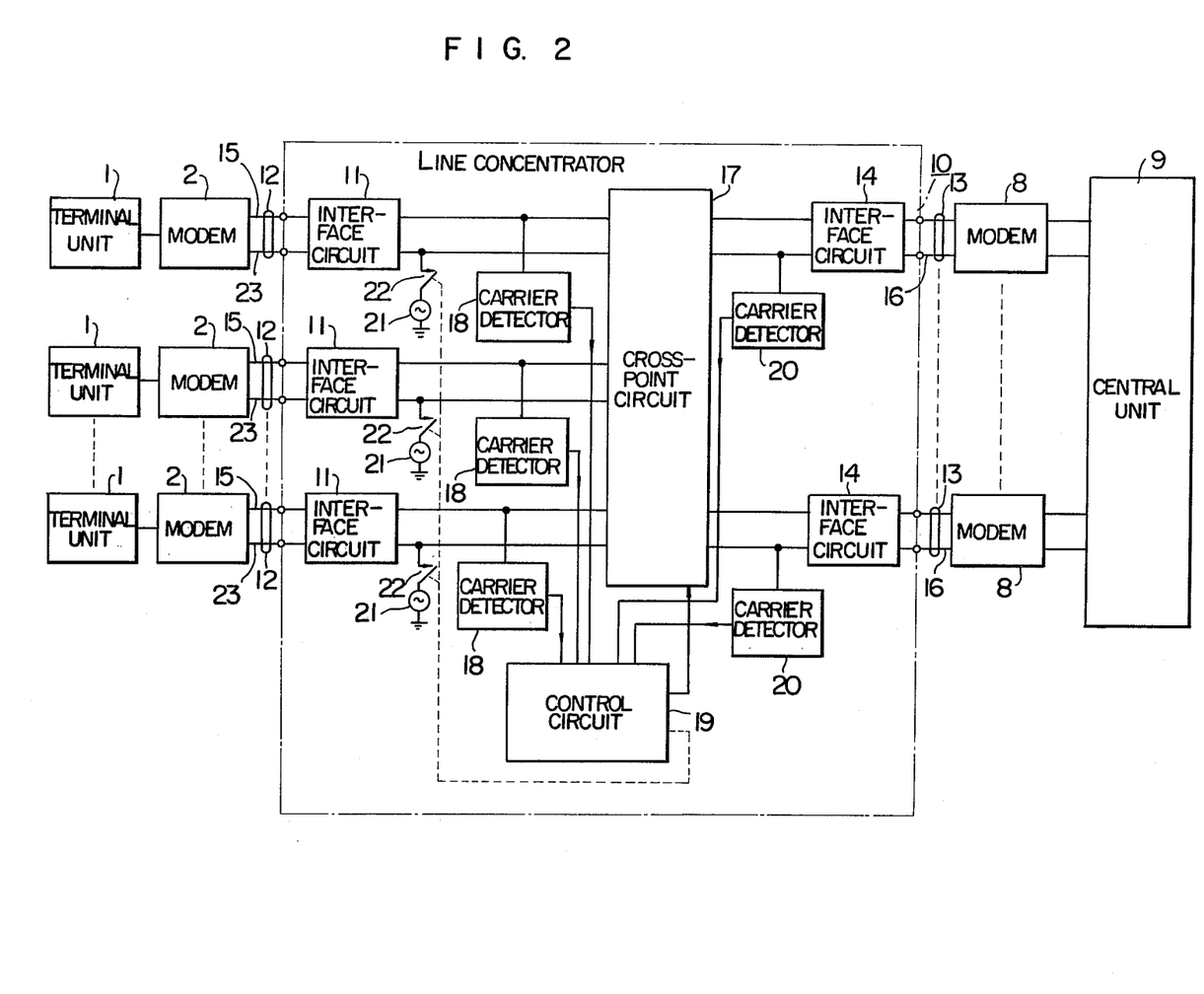
FIG. 2 is a block diagram showing the structure of a preferred embodiment of the ac type line concentrator according to the present invention when applied to a data communication system.

A preferred embodiment of the present invention will now be described in detail with reference to FIG. 2. FIG. 2 is a block diagram showing the structure of the ac type line concentrator embodying the present invention when applied for line concentration in a data communication system.

In FIG. 2, like reference numerals 1, 2, 8 and 9 are used to designate like parts appearing in FIG. 1. The ac type line concentrator according to the present invention is generally designated by the reference numeral 10 and comprises $m$ interface circuits 11, $n$ ($n < m$) interface circuits 14, a crosspoint circuit 17, $m$ carrier detectors 18, $n$ ($n < m$) carrier detectors 20, a control circuit 19, $m$ terminal make-busy carrier sources 21, and $m$ terminal make-busy switches 22. The interface circuits 11 are respectively connected to $m$ incoming lines 12 each including a signal receiving line 15 and a signal transmitting line 23 which are connected through a modem 2 to a terminal unit 1. The interface circuits 14 are respectively connected to $n$ ($n < m$) outgoing lines 13 each including a signal receiving line 16. Thus, $n$ signal receiving lines 16 are connected through associated modems 8 to a central unit 9. The crosspoint circuit 17 is composed of analog switches for establishing connections between the incoming lines 12 and the outgoing lines 13. The carrier detectors 18 and 20 detect appearance of a carrier frequency signal on the associated signal receiving lines 15 and 16, respectively. The control circuit 19 applies a connection control instruction signal to the crosspoint circuit 17 in response to the detection of the carrier frequency signal on the signal receiving lines 15 and 16 by the associated carrier detectors 18 and 20. The terminal make-busy switches 22 are respectively connected in series with the terminal make-busy carrier sources 21 and are adapted to be on-off controlled by the control output of the control circuit 19.

The operation of the data communication system having the line concentrator according to the present invention will now be described with reference to FIG. 2. A data signal output of one of the terminal units 1 is modulated by the associated modem 2, and a carrier frequency signal output of this modem 2 is applied to the associated interface circuit 11 in the ac type line concentrator 10. The interface circuits 11 are means for effecting signal reception and transmission between the incoming lines 12 and the line concentrator 10 and may be a balanced circuit using a transformer. The interface circuits 14 connected to the outgoing lines 13 have the same function as that of the interface circuits 11. The signal receiving section in each of the interface circuits 11 and 14 connected respectively to the associated signal receiving lines 15 and 16 includes impedance matching means for ensuring the impedance matching between the lines even when the crosspoints of the crosspoint circuit 17 are in an open position. Thus, when any one of the incoming lines 12 is not connected to any one of the outgoing lines 13, that is, when the crosspoints corresponding to the incoming line 12 are in an open position, the impedance matching means in the interface circuits 11 and 14 have respectively the terminal impedances equivalent to the line impedance. Therefore, the desired impedance matching between the incoming lines 12 and the outgoing lines 13 can be reliably attained.

The signal passed through the interface circuit 11 is applied to the crosspoint circuit 17, and at the same time, a portion of this signal is applied to the associated carrier detector 18. The carrier detector 18 detects the received carrier frequency signal and applies a CD signal to the control circuit 19. This control circuit 19 functions to control the on-off operation of the crosspoints of the crosspoint circuit 17 in response to the application of the CD signals from the carrier detectors 18 and 20 connected to the signal receiving lines 15 and 16 through the associated interface circuits 11 and 14. Thus, when the CD signal is applied from the specific carrier detector 18 due to the detection of the carrier frequency signal, the control circuit 19 searches for an idle and available one of the outgoing lines 13 to connect the specific incoming line 12 to the outgoing line 13 which is found idle and available. This connecting operation will be described in more detail. In the control circuit 19, a cyclic signal or scanning pulse signal is used for detecting the appearance of the CD signal from any one of the carrier detectors 18 and 20 associated respectively with the incoming lines 12 and outgoing lines 13. When the appearance of the CD signal from one of the carrier detectors 18 associated with the incoming lines 12 is detected as a result of scanning with the incoming line scanning pulse signal, this CD signal is applied to an AND gate. A signal indicative of the detection of an idle and available one of the outgoing lines 13 is generated as a result of scanning with the outgoing line scanning pulse signal which is synchronous with the incoming line scanning pulse signal. This latter signal is also applied to the AND gate so as to select the outgoing line 13 which is suitable for connection with the specific incoming line 12. The control circuit 19 applies a connection control instruction signal to the crosspoint circuit 17 so that the necessary crosspoints of the crosspoint circuit 17 can be closed to connect the specific incoming line 12 to the outgoing line 13 selected by the control circuit 19. Simultaneously with the turnon of the crosspoints, the terminating ends of the impedance matching means in the corresponding interface circuits 11 and 14 are opened, and the specific terminal unit 1 is connected to the central unit 9 by the specific lines 12 and 13 in impedance matching relation.

When the necessary crosspoints of the crosspoint circuit 17 are closed in the manner above described, the carrier frequency signal appearing on the specific incoming line 12 is transmitted to the specific modem 8 through the crosspoint circuit 17 and associated interface circuit 14, and the received carrier frequency signal is demodulated by this modem 8 so that the data signal can be applied to the central unit 9. The central unit 9 receiving the data signal transmitted from the specific terminal unit 1 can transmit a data signal to this terminal unit 1 by way of a route reverse to the route above described. That is, the data signal applied from the central unit 9 is modulated by the specific modem 8, and the output of this modem 8 is applied to the ac type line concentrator 10. This signal passes through the specific interface circuit 14 and through the already closed crosspoints of the crosspoint circuit 17 to be applied to the specific interface circuit 11, thence to the associated modem 2 by way of the associated signal transmitting line 23, and the associated modem 2 demodulates the modulated signal to apply the data signal to the specific terminal unit 1. Upon completion of the data transmission and reception between the terminal unit 1 and the central unit 9, the transmission of the carrier frequency signal from the modem 2 is ceased under control of the terminal unit 1. When no signal appears on the associated signal receiving line 15, no CD signal appears from the associated carrier detector 18 in the ac type line concentrator 10, and the control circuit 19 acts to open the already closed crosspoints of the crosspoint circuit 17. The crosspoints of the crosspoint circuit 17 are provided by semiconductor analog switches capable of switching analog signals so that an ac signal can be transmitted and received between the incoming lines 12 and the outgoing lines 13.

Any one of the terminal units 1 can be made busy under control of the control circuit 19 disposed in the ac type line concentrator 10. This is done by turning on the associated make-busy switch 22 by the control output of the control circuit 19. When the make-busy switch 22 is turned on, a make-busy carrier signal is applied from the associated make-busy carrier source 21 to the specific terminal unit 1 through the make-busy switch 22, associated interface circuits 11 and associated signal transmitting line 23. In response to the reception of this make-busy carrier signal, the terminal unit 1 is made busy when it is not placed in operation, that is when it is not transmitting any data signal toward the central unit 9. Therefore, the ac type line concentrator 10 is constructed so that the make-busy carrier signal would not be applied to any one of the terminal units 1 unless the crosspoint switches corresponding to the incoming line 12 connected to the specific terminal unit 1 are turned off. In other words, the make-busy carrier sources 21 for applying the make-busy carrier signal to the individual terminal units 1 and the make-busy switches 22 turned on by the control output of the control circuit 19 are provided in the ac type line concentrator 10, so that any specific one of the terminal units 1 can only be made busy by the make-busy carrier signal applied from the associated make-busy carrier source 21 through the associated make-busy switch 22.

It may become necessary to make busy all the terminal units 1 when, for example, the operating period of time of the central unit 9 is limited for some reason or trouble occurs in the central unit 9. When, in such a case, appearance of a carrier frequency signal on all the outgoing lines 13 connected to the central unit 9 is detected by the associated carrier detectors 20 and control circuit 19 prior to appearance of the data signal on the incoming lines, all the terminal units 1 are made busy by turning on all the make-busy switches 22 under control of the control circuit 19 and by applying the make-busy carrier signal to all the terminal units 1. Thus, in this case, all the terminal units 1 can be made busy by the make-busy carrier signal applied from the associated make-busy carrier sources 21.

Figure 3:
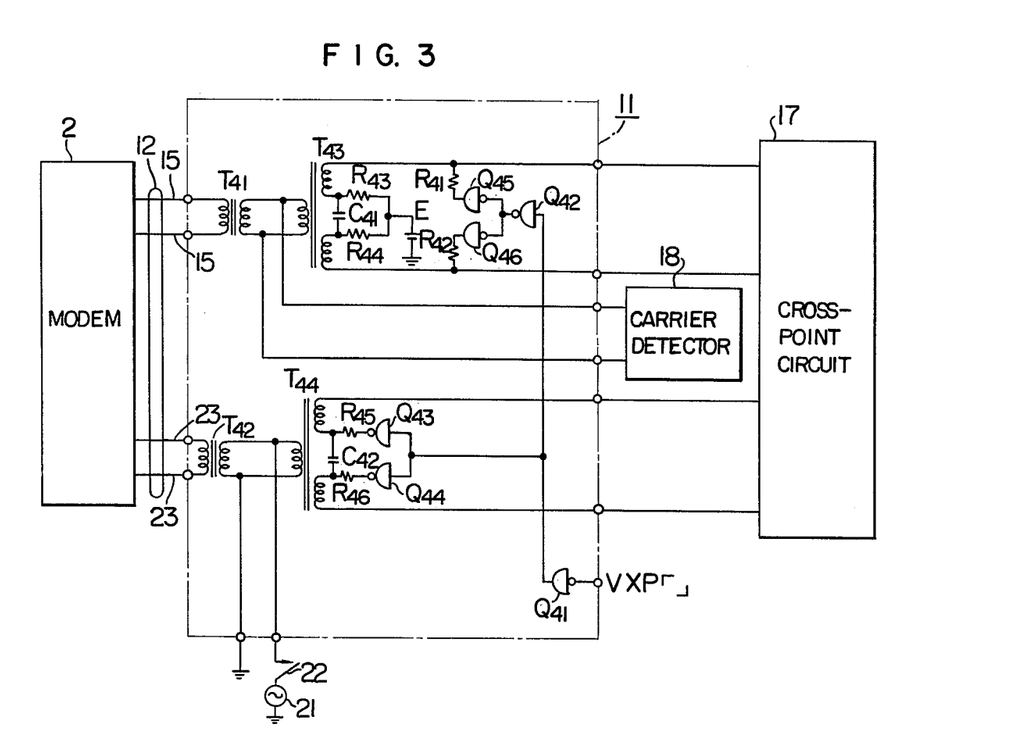
FIG. 3 is a circuit diagram for illustrating by way of example the interface circuit for the incoming line as shown in FIG. 2.

FIG. 3 shows a circuit diagram for illustrating by way of example the interface circuit 11 as shown in FIG. 2. The same reference numerals designate like parts shown in FIG. 2. Referring to FIG. 3, reference characters $T_{41}$ and $T_{42}$ designate transformers with the impedance-matching ratio $600\Omega : 600\Omega$ for interfacing an incoming line 12, characters $T_{43}$ and $T_{44}$ transformers with the impedance-matching ratio $600\Omega : 300\Omega$ for interfacing a crosspoint circuit 17, characters $R_{41}$ and $R_{42}$ resistors for terminating the secondary circuit of the transformer $T_{43}$, characters $Q_{41}$ and $Q_{42}$ NAND gates, characters $Q_{43}$ to $Q_{46}$ collector-open type NAND gates, characters $R_{43}$ to $R_{46}$ resistors for setting a dc bias current, characters $C_{41}$ and $C_{42}$ ac coupling capacitors, and character E a dc power source for providing a dc bias current. When the crosspoint switch associated with the incoming line 12 is opened and consequently the incoming line 12 is not connected to the outgoing line 13, a high level signal is applied to a control terminal VXP⌐ ⌐ from the control circuit 19 as shown in FIG. 2, so that the output of NAND gates $Q_{45}$ and $Q_{46}$ is brought down to a low level and then resistors $R_{41}$ and $R_{42}$ are connected in series to each other. Consequently, the impedance of the interface circuit 11 into which the incoming line 12 looks, becomes $600\Omega$ and then the impedance matching between the crosspoint circuit 17 and the incoming line 12 can be attained. When the crosspoint switch associated with the incoming line 12 is closed and consequently the incoming line 12 is connected to the outgoing line 13, a low level signal is applied to the control terminal VXP⌐ ⌐ from the control circuit 19, so that NAND gates $Q_{45}$ and $Q_{46}$ are cut off and the resistors $R_{41}$ and $R_{42}$ are disconnected.

On the other hand, when the incoming line 12 is connected to the outgoing line 13, the outputs of NAND gates $Q_{43}$ and $Q_{44}$ are brought down to a low level and then resistors $R_{45}$ and $R_{46}$ are connected since a low level level signal is applied to the control terminal VXP $\lceil \, \rfloor$. When the incoming line 12 is not connected to the outgoing line 13, NAND gates $Q_{43}$ and $Q_{44}$ come into a nonconducting state, so that resistors $R_{44}$ and $R_{45}$ are disconnected. The number of the interface circuit 11 is determined in accordance with the number of the incoming lines 12.

Figure 4:
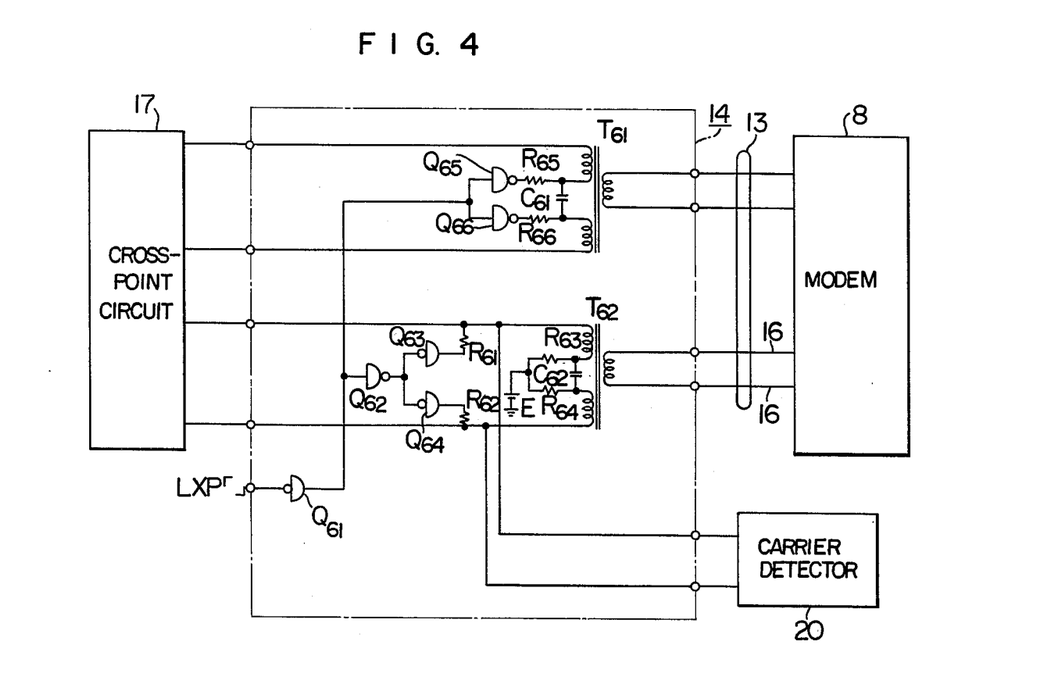
FIG. 4 is a circuit diagram for illustrating by way of example the interface circuit for the outgoing line as shown in FIG. 2.

FIG. 4 shows a circuit diagram for illustrating by way of example the interface circuit 14 as shown in FIG. 2. The same reference numerals designate like parts shown in FIG. 2. Referring to FIG. 4, reference characters $T_{61}$ and $T_{62}$ designate transformers with the impedance-matching ratio 300Ω:600Ω for interfacing the outgoing like 13, character $R_{61}$ and $R_{62}$ resistors for terminating the primary circuit of transformer $T_{62}$, characters $Q_{61}$ and $Q_{62}$ NAND gates, characters $Q_{63}$ to $Q_{66}$ collector-open type NAND gates, characters $R_{63}$ to $R_{66}$ resistors for setting a dc bias current, characters $C_{61}$ and $C_{62}$ ac coupling capacitors, character E a dc power source for providing a dc bias current. When the incoming line 12 and the outgoing line 13 are not connected, a high level signal is applied to a control terminal LXP $\lceil \, \rfloor$ from the control circuit 19 and NAND gates $Q_{63}$ to $Q_{66}$ come into a conducting stage, so that resistors $R_{61}$ and $R_{62}$ are connected in series, thereby to attain the impedance matching between the crosspoint 17 and the modem 8. When the incoming line 12 and the outgoing line 13 are connected, a low level signal is applied to the control terminal LXP $\lceil \, \rfloor$ from the control circuit 19 and then NAND gates $Q_{63}$ and $Q_{64}$ are cut off, so that resistors $R_{61}$ and $R_{62}$ are disconnected. At the same time, the outputs of NAND gates $Q_{65}$ and $Q_{66}$ are brought down to a low level and resistors $R_{65}$ and $R_{66}$ are grounded. The number of the interface circuit 14 is determined in accordance with the number of the outgoing lines 13.

Figure 5:
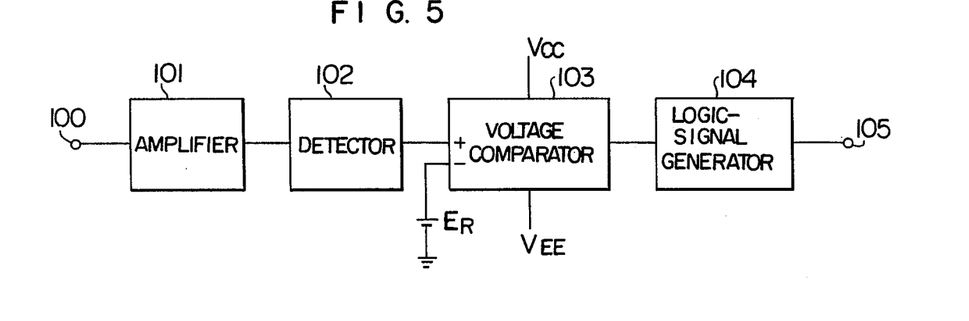
FIG. 5 is a block diagram for illustrating the carrier detector circuits as shown in FIG. 2.

FIG. 5 shows a block diagram for illustrating the carrier detector circuits 18 and 20 as shown in FIG. 2. Referring to FIG. 5, the carrier detector circuit is provided with an amplifier 101, a rectifier 102, a voltage comparator 103 and a logic-signal generator 104. When a carrier signal is received at an input 100, the carrier signal is rectified by detector 102 to produce a dc voltage after it is amplified by amplifier 101. The dc voltage is applied to a voltage comparator 103. The comparator 103 may be constituted by operational amplifiers in which the dc output voltage of the detector 102 is applied to the non-inverting input and a reference voltage $E_R$ is applied to the inverting input.

When the carrier signal is received at the input 100 and the dc output voltage of the detector 102 exceeds the reference voltage $E_R$, the output of the comparator 103 is brought down to a negative potential $(V_{EE})$. When no signal is received at the input 100, the output of the comparator 103 is brought up to a positive potential $(V_{CC})$. Those output voltages are applied to a logic-signal generator 104 and converted into two logic signals. For example, when the carrier signal of at least -(33 to 38) dbm is received at the input 100, the output of the logic-signal generator 104 becomes 0 volt, and when the carrier signal of no more than -(33 to 38) dbm is received at the input 100, the output of the logic-signal generator 104 becomes 5 volts. In this case, there is provided a hysteresis action of at least 2 db between a first level that a carrier signal is detected and a second level that no signal is detected. Both carrier detection circuits 18 and 20 shown in FIG. 2 have the same circuit arrangement.

Figure 6:
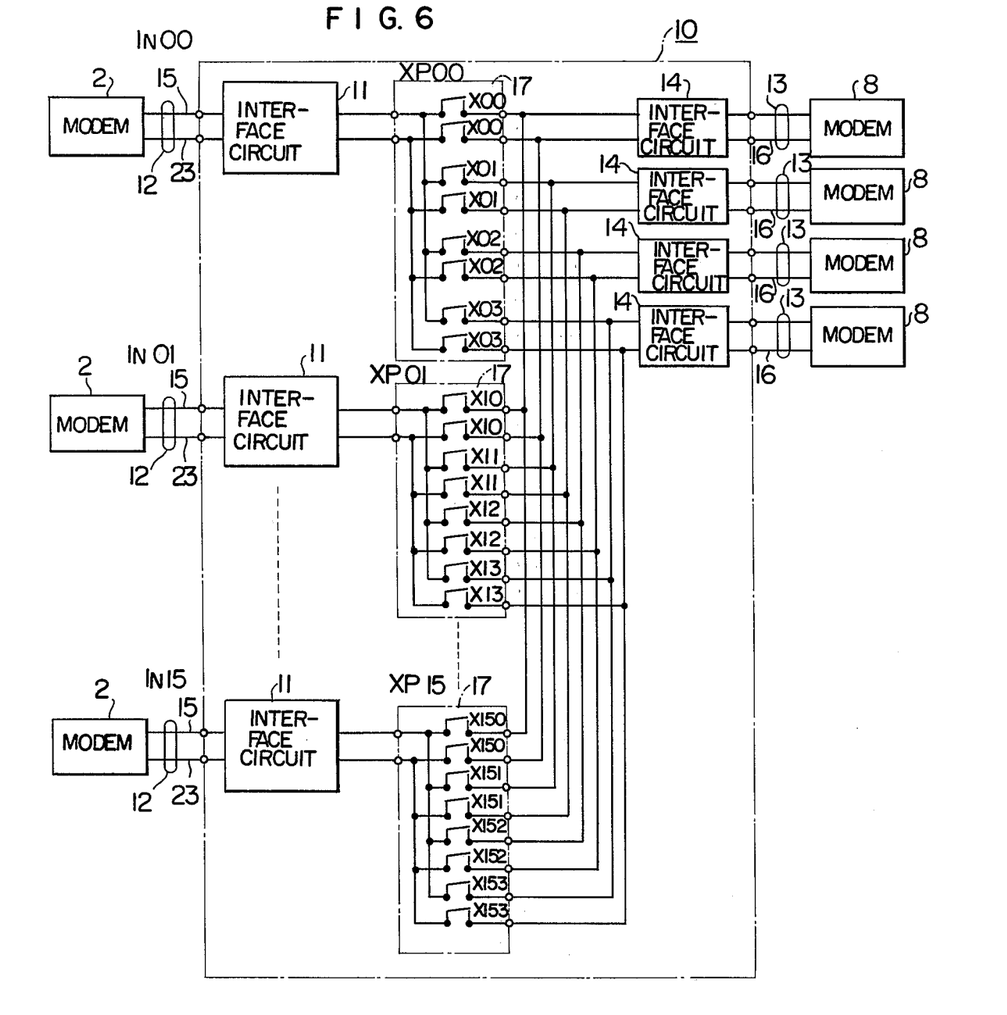
FIG. 6 is a block diagram for illustrating by way of example the ac type line concentrator circuit as shown in FIG. 2.

FIG. 6 shows a block diagram for illustrating by way of example an ac type line concentrator circuit which is provided with 16 incoming lines and 4 outgoing lines. For convenience of explanation, the crosspoint switches of the crosspoint circuit 17 are equivalently represented in the form of a switch contact. In FIG. 6, the connection between the crosspoint circuit 17, the incoming interface circuit 11 and the outgoing interface circuit 14 are shown in which there are provided sixteen crosspoint circuits 17 each corresponding to an interface circuit 11, and the switching action of the crosspoint switches is controlled in response to a signal for establishing connection between the incoming line 12 and the outgoing line 13, which is supplied from the control circuit 19 shown in FIG. 2.

Assuming that the crosspoint switch X00 of the crosspoint circuit XP00 corresponding to the incoming line IN00 is closed, the other crosspoint switches X01, X02, X03 and X10 to X150 connected with the crosspoint switch X00 are not closed. As seen from FIG. 6, in this case, the number of the outgoing lines 13 simultaneously connectable to the incoming lines 12 is maximum.

Figure 7:
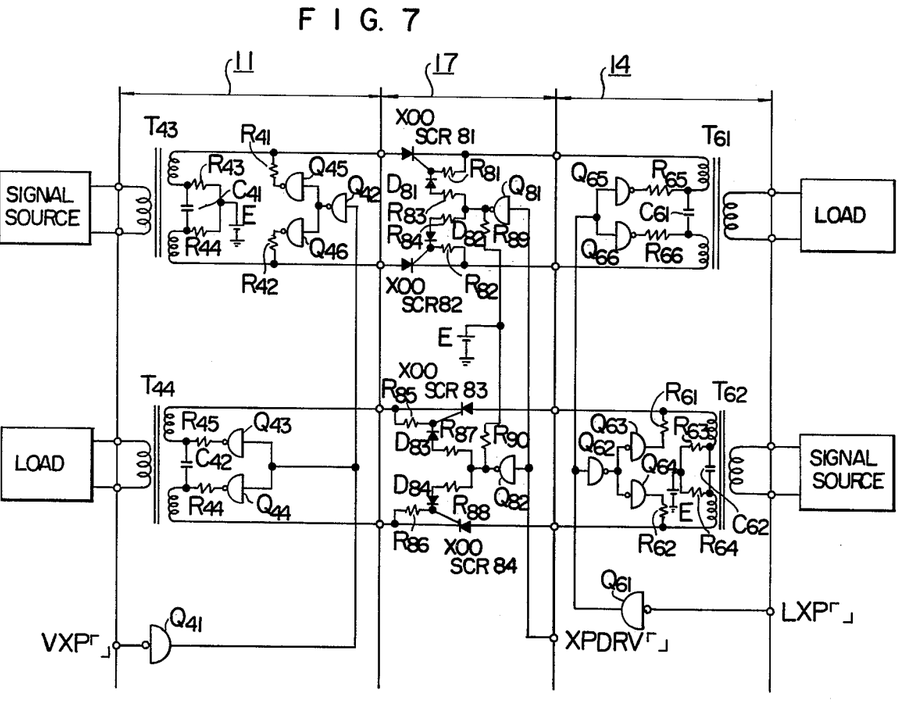
FIG. 7 is a circuit diagram for illustrating by way of example the crosspoint circuit as shown in FIG. 2.

FIG. 7 shows a circuit diagram for illustrating by way of example the crosspoint circuit 17 as shown in FIG. 2. Referring to FIG. 7, reference characters $SCR_{81}$ to $SCR_{84}$ designate silicon controlled rectifiers constituting the crosspoint switch X00 shown in FIG. 6. The silicon controlled rectifier has a high impedance between its anode and cathode in its nonconducting stage, and a low impedance therebetween in its conducting stage. Reference characters $Q_{81}$ and $Q_{82}$ designate collector-open type NAND gates, characters $R_{81}$ to $R_{90}$ resistors, characters $D_{81}$ to $D_{84}$ diodes, and characters E a dc power source for providing a dc bias current. Since the upper and lower sections of the crosspoint circuit 17 shown in FIG. 7 operate in substantially the same manner, the operation of the upper section only will be described below.

Figure 8:
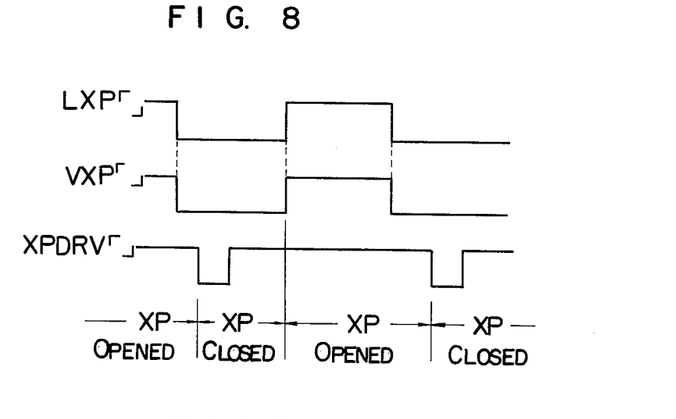
FIG. 8 is a time chart for illustrating by way of example the signals for establishing connection between the incoming line and the outgoing line, which are applied to the control terminals VXP ⌐ ⌐, XPDRV ⌐ ⌐ and LXP ⌐ ⌐ from the control circuit as shown in FIG. 2.

FIG. 8 shows a time chart for illustrating the signals for establishing connection between the incoming line 12 and the outgoing line 13, which are applied to the control terminals VXP $\lceil \, \rfloor$, XPDRV $\lceil \, \rfloor$ and LXP $\lceil \, \rfloor$ from the control circuit 19 shown in FIG. 2.

When a low level signal is applied to the control terminal LXP $\lceil \, \rfloor$, the outputs of NAND gates $Q_{65}$ and $Q_{66}$ are brought down to a low level and then resistors $R_{65}$ and $R_{66}$ are grounded through the output resistor of NAND gates $Q_{65}$ and $Q_{66}$. When a low level signal is applied to the control terminal XPDRV $\lceil \, \rfloor$, the outputs of NAND gates $Q_{81}$ and $Q_{82}$ are brought up to a high level and then the silicon controlled rectifiers $SCR_{81}$ and $SCR_{82}$ come into a conducting state, thereby to provide a low impedance since the gate electrodes of both $SCR_{81}$ and $SCR_{82}$ are forward-biased. Consequently, the following dc loops are formed: (1) E(+λ)—$R_{43}$—secondary winding of $T_{43}$—$SCR_{81}$—secondary winding of $T_{61}$—$R_{65}$—$Q_{65}$—E(−) and (2) E(+)—$R_{44}$—ternary winding of $T_{43}$—$SCR_{82}$—ternary winding of $T_{61}$—$R_{66}$—$Q_{66}$—E(−).

When the crosspoint switch is opened, a high level signal is applied to the control terminal LXP $\lceil \, \rfloor$ and then the outputs of NAND gates $Q_{65}$ and $Q_{66}$ are cut off, so that the above-described dc loops (1) and (2) are opened. The control terminals VXP $\lceil \, \rfloor$ and LXP $\lceil \, \rfloor$ are used for controlling the interface circuits 11 and 14 as described hereinbefore with reference to FIGS. 3 and 4.

Figure 9:
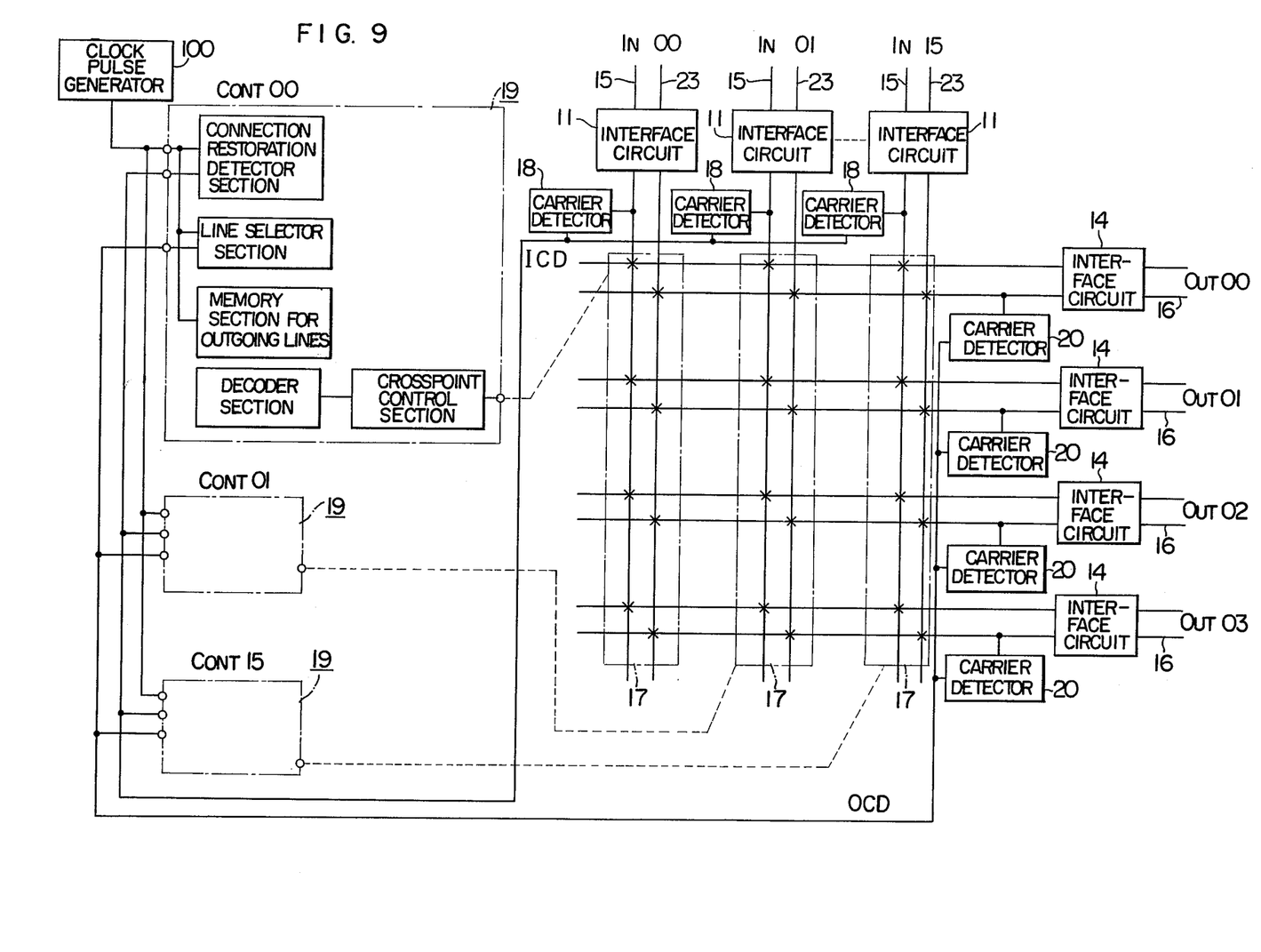
FIG. 9 is a block diagram for illustrating by way of example the control circuit as shown in FIG. 2.

FIG. 9 shows a block diagram for illustrating by way of example the control circuit 19 as shown in FIG. 2 in which the crosspoint circuits 17 associated with 16 incoming lines and four outgoing lines are shown. The switching operation of the crosspoint circuits 17 is controlled by logic signals supplied from the output of the crosspoint control section of the control circuit 19. The carrier detector circuit 18 connected to the receiving line 15 of the incoming line 12 detects line connection by a carrier signal and generates a CD signal "ON" and also detects line restoration by lack of a carrier signal and generates a CD signal "OFF".

Figure 10:
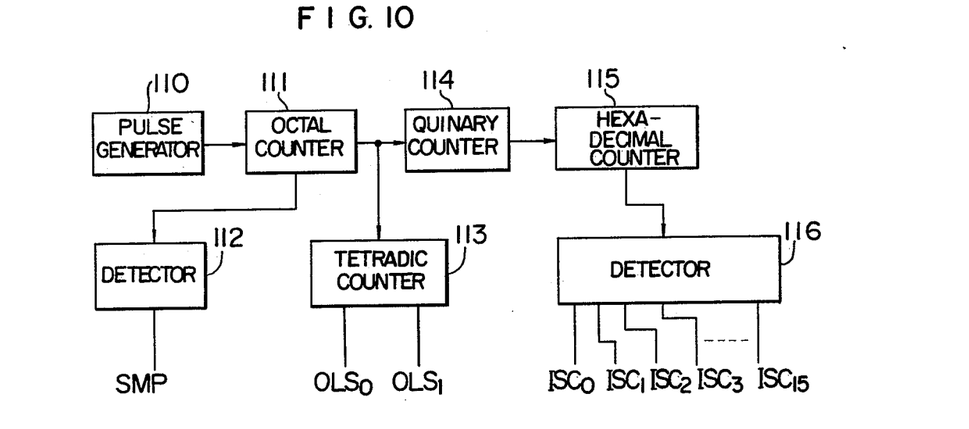
FIG. 10 is a block diagram for illustrating by way of example the circuit arrangement of the clock pulse generator section as shwon in FIG. 9.

FIG. 10 shows a block diagram for illustrating by way of example the circuit arrangement of the block pulse generator section 100 as shown in FIG. 9. The pulses generated from the clock pulse generator 110 are fed to the detector 112 through the octal counter 111 to produce the sampling pulse SMP. Another output of the octal counter 111 is fed to the tetradic counter 113 and the quinary counter 114. FIG. 10 shows the case of sixteen incoming lines and four outgoing lines. The output signals $OLS_0$ to $OLS_1$ produced from the tetradic counter 113 are fed to the control circuit 19 as a clock pulse for scanning the outgoing lines. The output of the quinary counter 114 is fed to the hexadecimal counter 115 and the pulses $ISC_0$ to $ISC_{15}$ for scanning 16 incoming lines are generated by the decoder 116. Accordingly, the outgoing line is scanned (5/4) times within a period of time when one incoming line is scanned.

Figure 11:
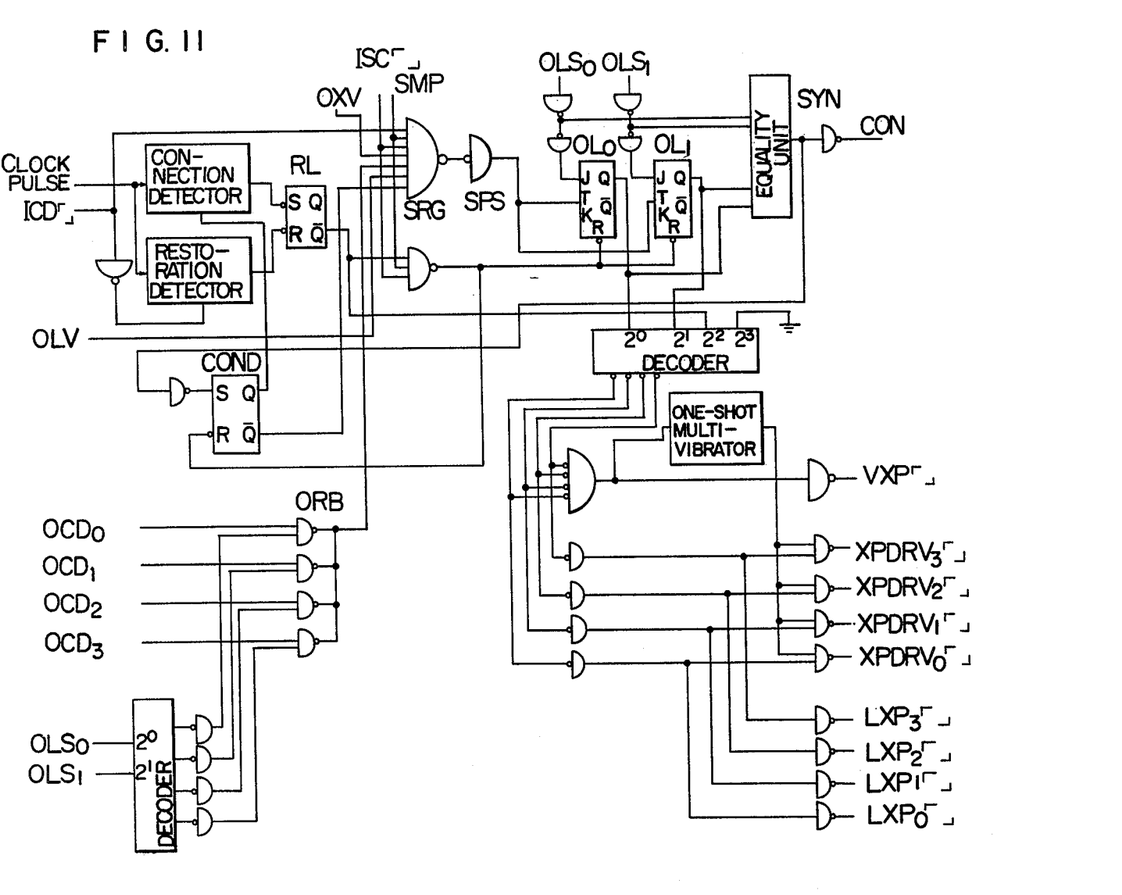
FIG. 11 is a circuit diagram for illustrating in detail by way of example the control circuit as shown in FIG. 2.
Figure 13:
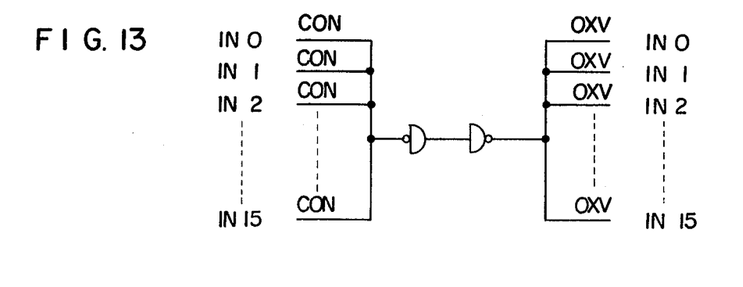
FIG. 13 is a circuit diagram for illustrating by way of example the circuit for generating the signal representative of the vacant status of the outgoing line.

FIG. 11 shows a circuit diagram for illustrating by way of example the control circuit 19 shown in FIG. 2. Referring to FIG. 11, the flip-flop circuits $OL_0$ and $OL_1$ constitute a memory registor for storing the number of the outgoing lines, and the "Q" outputs of the memory registors are brought up to a high level in a state of line restoration and provide the decimal output of "3". In the case where the number of the outgoing lines is the decimal number of "0" to "3" and the outputs of the flip-flop circuits $OL_0$ and $OL_1$ are fed to the decoder, the decoder selects the outgoing line No. 3. Therefore, a high level signal is applied to the $2^2$ digit input of the decoder at the time of line restoration so that the outgoing line of the other number than "0" to "3" can be selected at the time of line restoration in order to permit the decoder to select the outgoing line No. 7, and consequently to transmit such a signal that any crosspoint switch is not operated. At the same time, the flip-flop circuit COND is reset and its output "Q" is brought up to a high level, and under this condition, when the carrier detector circuit associated with the incoming line 0 generates a CD signal "ON", the terminal ICD⌐o⌐ is brought up to a high level. The input signal of the terminal ICD⌐o⌐ is fed to NAND gate SRG. When the incoming line scanning pulse produced from the clock pulse generator section 100 coincides with timing of the incoming line "0", the terminal ISC⌐o⌐ is brought up to a high level. Since one control circuit 19 is provided for every incoming line, the incoming line scanning pulse permits the line-connecting operation of each control circuit 19 to be carried out sequentially, so that the double line connection can be prevented. The terminal OXV⌐⌐ is a signal line for signalling the vacant status of the outgoing line and is brought up to a high level when the outgoing lines correspoinding to the number of the outgoing line scanning pulses $OLS_0$ and $OLS_1$ are vacant, and the terminal OXV is brought down to a low level when those outgoing lines are in a "BUSY" state. The circuit for generating the signal of the terminal OXV is shown in FIG. 13, in which the output of a signal CON of each incoming line is ORed and then distributed to the control circuit 19 associated with each incoming line as a signal for indicating the vacant status again after inverted by an inverter. In FIG. 11, a signal ORB is the logical sum of the output signals supplied from the carrier detection circuits associated with four receiving lines of the outgoing lines and the output signals of the decoder in response to the outgoing scanning pulses $LS_0$ and $LS_1$, which are time-sharing signals for indicating the vacant status of the receiving lines of the outgoing lines. Namely, in the outgoing lines corresponding to the outgoing line scanning pulses $OLS_0$ and $OLS_1$, the signal OCD corresponding to the receiving line of the outgoing line is brought up to a high level when the outgoing line is in a vacant state and the carrier signal is not received from the modem 8 on the side of the central unit 9, and when the outgoing lines are in a "BUSY" state and a carrier signal is received from the modem 8 on the side of the central unit, the OCD signal is brought down to a low level. In that case, the signal ORB is brought down to a low level and then NAND gate SRG is cut off, so that the outgoing line corresponding to the OCD signal cannot be further connected to the incoming line. SMP is a sampling pulse for preventing the erroneous operation of the control circuit 19.

Figure 12:
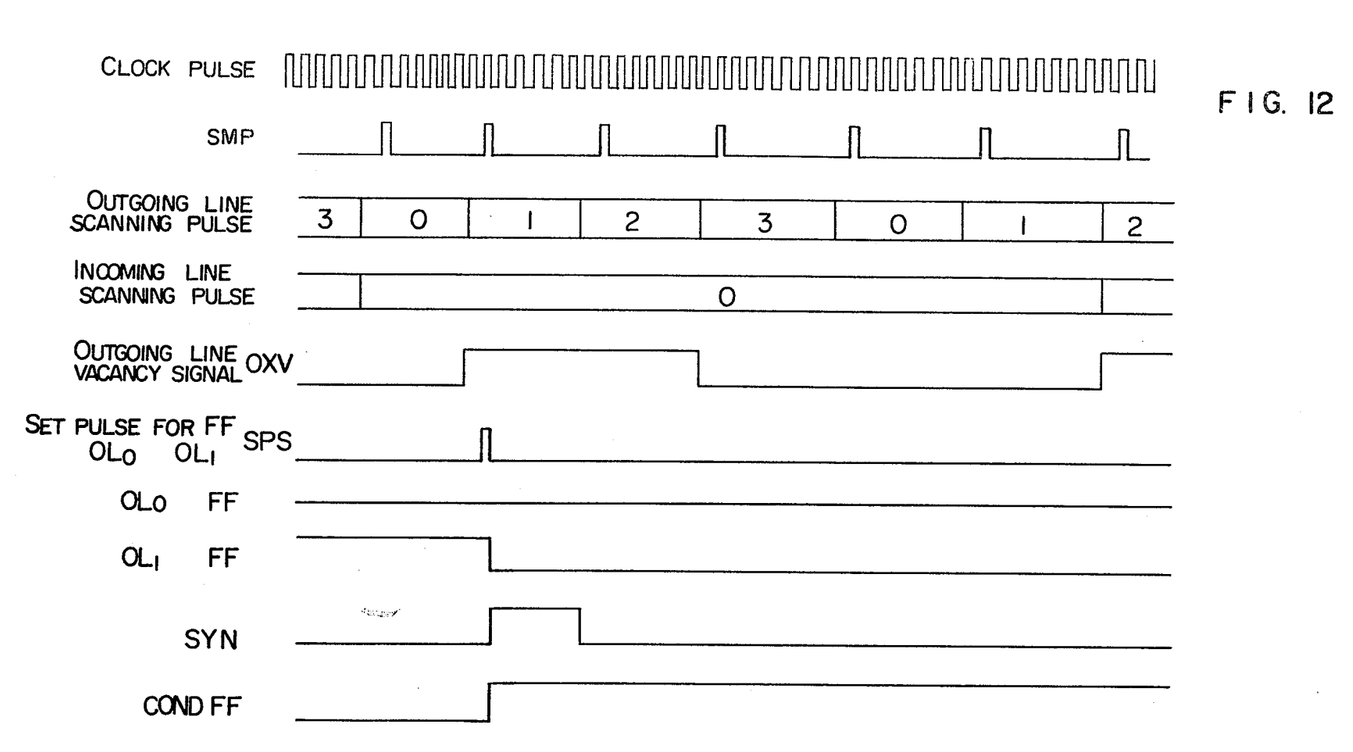
FIG. 12 is a time chart for illustrating by way of example the signals of establishing connection between the incoming line and the outgoing line in connection with the circuit operation of the control circuit as shown in FIG. 2.

FIG. 12 shows a time chart for illustrating by way of example the connecting operation of the control circuit 19. In FIG. 13, the signal OXV may indicate the vacant status of the outgoing lines. Accordingly, when the scanning pulse for terminal ISC⌐o⌐ of the incoming line is brought up to a high level, the outgoing lines are sequentially scanned to seek a vacant outgoing line and select the first vacant outgoing line. Namely, in FIG. 11, NAND gate SRG operates at the time of the outgoing line of No. 1 being scanned, and the scanning pulses $OLS_0$ and $OLS_1$ of the outgoing lines are stored in the memory registers $OL_0$ and $OL_1$. In this case, the memory registers $OL_1$ and $OL_2$ for each incoming line, which has stored the decimal number "7" in the state of line restoration changes the stored content to "1". The signals stored in registers $OL_0$ and $OL_1$ and the scanning pulse signals of the outgoing lines are fed to the equality unit, and the signal SYN is brought up to a high level when both the signals coincide, and then flip-flop circuit COND for connection memory is set. When flip-flop circuit COND is set, the input of NAND gate SRG is brought down to a low level and the further connecting operation of the control circuit 19 corresponding to the connected outgoing line is inhibited. And at the same time, after the specific number of the outgoing line is stored in the memory register for the outgoing lines, the signal CON is brought down to a low level every time the stored specific number of the outgoing line is scanned, thereby to indicate to the control circuits of the other incoming lines that the specific outgoing line stored in the memory registers is in a "BUSY" state. The output of memory registers $OL_0$ and $OL_1$ for the outgoing lines is applied to the inputs of 4-digit decoder corresponding to $2^0$ and $2^1$ digits but the input of $2^2$ digit of the 4-digit decoder is changed over to a low level from a high level in a predetermined time after the flip-flop circuit COND is set since the flip-flop circuit RL is set and then the output Q of the flip-flop circuit RL is applied to the input of $2^2$ digit decoder. The time interval between the moment when the flip-flop circuit COND is set and the moment when the flip-flop circuit RL is set is determined by a connection detector circuit. The output of the decoder is used as a signal for driving the crosspoint circuit 17. The signal of the terminal VXP ⌐ ⌐ is fed to the interface circuit 11 corresponding to each incoming line and the signals of the terminals XPDRV$_0$ ⌐ ⌐ to XPDRV$_3$ ⌐ ⌐ are fed to the crosspoint circuit 17 associated with each incoming line in the form of a pulse signal. The output signals of the terminals LXP$_0$ ⌐ ⌐ to LXP$_3$ ⌐ ⌐ are ORed with the corresponding output signals from the other control circuits 19 corresponding to the other incoming lines and then applied to the interface circuit 14 corresponding to the incoming line.

It will be understood from the foregoing detailed description that the present invention provides an ac type line concentrator which permits transmission of a carrier frequency signal between $m$ incoming lines connected to $m$ terminal units and $n$ ($n < m$) outgoing lines connected to a central unit in a data communication system or the like. Therefore, the present invention can eliminate the prior art necessity for provision of the modems disposed on the individual incoming and outgoing lines in the vicinity of the line concentrator. Thus, the floor areas required hitherto for the installation of such modems are unnecessary, and the use of the line concentrator of the present invention provides an economical and simplified data communication system. Further, the line concentrator according to the present invention is very advantageous in that it is capable of line concentration without being affected by the speed of data communication in a data communication system using voice frequency transmission lines. For instance, the same line concentrator can be used in both asynchronous data transmission transmitting data at a rate of 1200 b/s and synchronous data transmission transmitting data at a rate of 2400 b/s.

We claim:

1. An ac type line concentrator for use in a data communication system including a central unit and a plurality of terminal units, comprising a crosspoint circuit composed of analog switches for disconnectably connecting $m$ incoming lines and $n$ ($n < m$) outgoing lines, a control circuit for applying a connection control instruction signal to said crosspoint circuit in response to the detection of a carrier frequency signal appearing on one of said incoming and outgoing lines, impedance matching means for maintaining constant the impedances of said lines irrespective of on-off operation of said analog switches in said crosspoint circuit, and means for applying the carrier frequency signal appearing on said incoming and outgoing lines to said crosspoint circuit in ac signal form without demodulating the same, whereby the carrier frequency signal can be transmitted over said incoming and outgoing lines in the ac signal form.

2. An ac type line concentrator as claimed in claim 1, further comprising means for applying a terminal make-busy carrier signal to any one of said terminal units thereby making busy said terminal unit.

3. An ac type line concentrator as claimed in claim 1, further comprising carrier detecting means for detecting appearance of a carrier frequency signal on all said outgoing lines connected to said central unit prior to appearance of the data signal on said incoming lines thereby applying a detection output to said control circuit, and terminal make-busy switches operating in response to the resultant output of said control circuit thereby making busy all said terminal units.

4. An ac type line concentrator for use in a data communication system including a central unit and a plurality of terminal units, comprising:
   $m$ incoming lines each connected to one of said terminal units;
   $n$ ($n < m$) outgoing lines each connected to said central unit;
   a crosspoint switch circuit for disconnectably connecting said incoming lines to said outgoing lines, said circuit including a plurality of analog switches;
   a first plurality of detector circuits each connected to one of said incoming lines for detecting a first carrier frequency signal from one of said terminal units associated with said one of incoming lines;
   a second plurality of detector circuits each connected to one of said outgoing lines for detecting a second carrier frequency signal from said central unit;
   a control circuit for transmitting to said crosspoint switch circuit a connection control instruction signal for selectively connecting one of said incoming lines to one of said outgoing lines in response to outputs of one of said first and second detector circuits; and
   a plurality of impedance matching means each connected between said crosspoint switch circuit and either one of said incoming or outgoing lines for maintaining constant the impedance of said incoming and outgoing lines irrespective of the on-off operation of said analog switches, whereby said first and second carrier frequency signals may be transferred between said incoming and outgoing lines in ac signal form.

5. An ac type line concentrator as claimed in claim 4, further comprising means for applying a terminal make-busy carrier signal to any one of said terminal units associated with any one of said incoming lines in response to an output of said control circuit when said incoming line is not connected to anyone of said outgoing lines, thereby to make busy said terminal unit.

6. An ac type line concentrator as claimed in claim 4, further comprising means for simultaneously applying a terminal make-busy carrier signal to all said terminal units in response to an output of said control circuit when all of said outgoing lines are not connected to said incoming lines and said second carrier frequency signal is simultaneously detected by all of said second detector circuits, thereby to simultaneously make busy all said terminal units.

* * * * *